Dec. 31, 1929. L. S. PEARL 1,741,332
DEVICE FOR CLEANING MEAT FROM BONES
Filed May 1, 1928
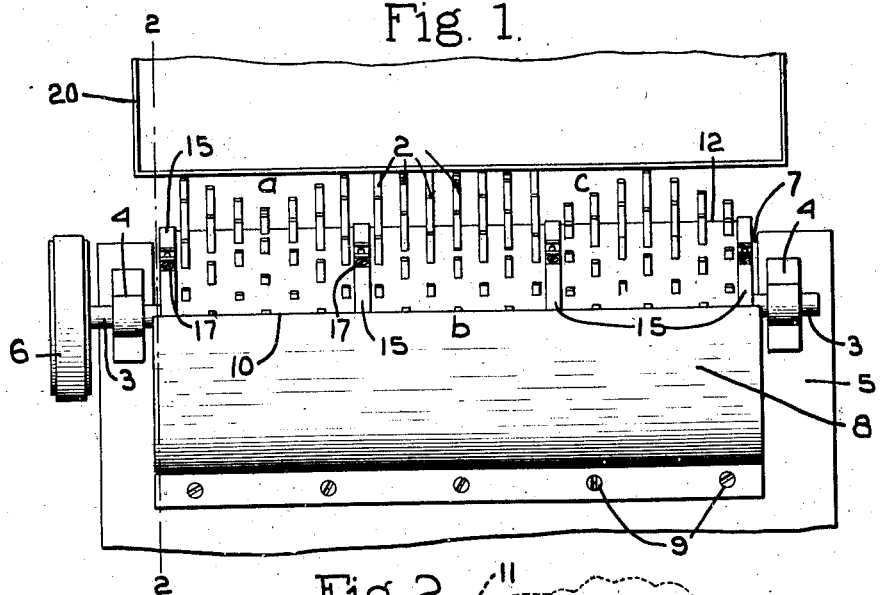
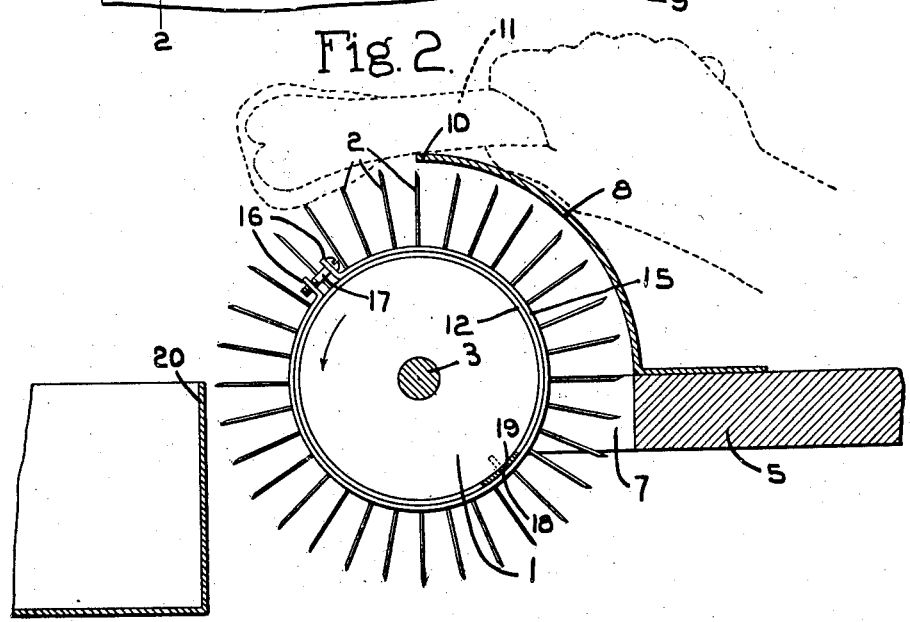
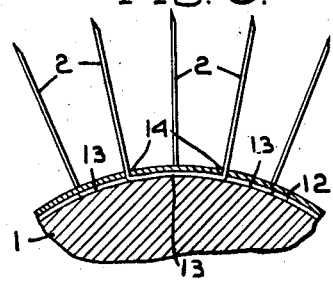
Inventor
Leonard S. Pearl
Attys Patented Dec. 31, 1929

1,741,332

UNITED STATES PATENT OFFICE

LEONARD S. PEARL, OF REVERE, MASSACHUSETTS, ASSIGNOR OF FORTY-FIVE ONE-HUNDREDTHS TO THOMAS F. RYAN, OF MEDFORD, MASSACHUSETTS

DEVICE FOR CLEANING MEAT FROM BONES

Application filed May 1, 1928. Serial No. 274,233.

This invention relates to a novel device for cleaning or stripping the meat from bones.

In every meat market the bones which are discarded have more or less edible meat still on them which would be useful if it could be removed. Bones which are thoroughly cleaned of meat bring just as much in the market as bones which have more or less meat on them since the purchaser of the bones is interested in the bone part and not in the meat. The meat, if stripped from the bone, is worth considerably more per pound than the bones and hence it is a common practice in meat markets to clean the bones of meat before they are disposed of.

Heretofore the way in which this was commonly done was by cutting the meat from the bone by hand. This is a slow tedious operation and the expense of labor for this purpose is sometimes nearly equal to or greater than the value of the meat thus reclaimed.

One of the objects of my present invention is to provide a device for thus cleaning the bone of meat by which a bone can be thoroughly and rapidly cleaned at a minimum expense thus making the operation of stripping the meat from the bones a profitable one.

In carrying out this object I provide a rotatable cylinder having resilient teeth extending radially from the periphery thereof and arranged so that when a bone is held adjacent the periphery of the cylinder the resilient teeth will rapidly and quickly strip the meat from the bone.

I prefer to employ a combined guard and bone rest adjacent the cylinder which acts as a guard for the toothed cylinder and also serves to support the bone being operated on.

In order to give an understanding of the invention I have illustrated in the drawings a selected embodiment thereof which will now be described after which the novel features will be pointed out in the appended claims.

Fig. 1 is a plan view of a bone-cleaning device embodying my invention;

Fig. 2 is an enlarged section on the line 2—2, Fig. 1;

Fig. 3 is an enlarged fragmentary section through the cylinder illustrating the manner in which the resilient teeth are retained in place.

My improved bone-stripping device comprises a rotary cylinder 1 having a plurality of resilient teeth 2 extending radially therefrom. This cylinder is shown as carried by a shaft 3 which is mounted in suitable bearings 4 that are secured to a bench or other support 5. The cylinder may be driven in any suitable way and as herein shown the shaft 3 is provided with a driving pulley 6 for this purpose.

In the construction herein shown the bench 5 is cut away as shown at 7 to provide a space to receive the cylinder 6.

Associated with the toothed cylinder is a combined guard and bone rest indicated at 8. This is preferably in the form of a sheet metal member which partially encloses the cylinder and is secured to the bench by suitable means 9. This guard and bone rest is shown as having a curved shape to correspond to the curvature of the toothed cylinder, the free edge 10 of said member 8 coming to a point substantially vertically over the axis of the cylinder and forming a support on which the bone 11 may rest as the meat is being stripped therefrom as shown in dotted lines Fig. 2.

It is quite important that the teeth 2 should be more or less resilient and they may be secured to the cylinder in various ways without departing from the invention. As herein shown said teeth are anchored in an envelope member 12 which encircles the cylinder 1 and is clamped thereto. This envelope 12 may be a piece of sheet metal and I will preferably form the teeth 2 in pairs, each pair being connected by a bridge portion 13 so that each pair of teeth has a general U shape.

The sheet metal envelope 12 is provided with suitably-spaced apertures 14 and the pairs of teeth in their U formation are inserted through the apertures, the bridge portion 13 by which the two teeth of any pair are connected being located on the inside of the envelope 12. When the envelope with the teeth 2 therein is applied to the cylinder 1 and clamped thereon the bridge portions 13 of the teeth will be clamped between the envelope 12 and the cylinder 1 and the teeth will thus be firmly held in position. If desired, I may spot weld each tooth to the envelope 12, although this is not essential.

The envelope 12 may be clamped to the cylinder 1 in any suitable way. In the illustrated embodiment of the invention I have shown one or more clamping rings 15 for this purpose, said clamping rings encircling the envelope 12 and each having at its end the ears 16 which are connected by the clamping screws 17.

In order to prevent the envelope from creeping on the cylinder I propose to provide the latter with a projection 18 adapted to be received in an opening 19 in the envelope.

The teeth 2 may be arranged to give any desired contour to the cylinder. In the construction shown in Fig. 1 the cylinder is relatively long and it is divided into sections $a$, $b$ and $c$. The teeth of section $a$ are arranged so as to give a concave peripheral formation, the teeth at the center of the section being shorter than at the ends. The teeth of section $b$ are of substantially all the same length while in section $c$ the teeth are shorter at the ends of the sections than at the center so that said section presents a convex shape.

In using the device the cylinder will be set in operation and the operator will hold the bone to be stripped against the edge 10 of the combined guard and support as shown in dotted lines Fig. 2. The end of the bone which projects beyond this edge will be acted on by the resilient teeth 2 which will rake the bone in the direction of its length and will strip it free and clean of meat. It will be understood, of course, that the operator will turn the bone so as to bring all sides thereof into position to be acted on by the stripping teeth 2. When one end of the bone is cleaned its position may be reversed.

In using the device the operator stands on the right hand side thereof in Fig. 2 so that the guard 8 is situated between the rotating disk and the operator.

A receptacle 20 may be placed in position to receive the meat that is stripped from the bone.

In operating on some bones the shape of the teeth shown at the section $a$ of the roll may be more effective while on other bones the shape of the teeth shown in sections $b$ and $c$ may be more effective.

By having the roll made with these toothed sections which have different exterior contours any bone may be easily shifted from one section to the other so that the section having teeth of the shape which is most effective may be readily used.

The teeth may have any desired arrangement on the cylinders either in rows extending longitudinally of the cylinder or in rows extending diagonally of the cylinder. Furthermore, the cutting ends of the teeth may be shaped to give a straight scraping action or to give more of a shearing action. Furthermore, said teeth may be of any desired length or have any desired angular relation adapted for the purpose of stripping meat from the bone.

While I have shown a construction wherein the teeth are in the shape of U-shaped units inserted through the envelope yet I wish it understood that this is only one way in which the teeth may be formed and that my invention includes any arrangement of teeth on the cylinder however constructed that will perform the desired operation of removing the meat from the bone. Furthermore, while I have herein shown a construction in which the three sections $a$, $b$ and $c$ having the teeth of different contour all form part of the same cylinder yet it would be within my invention if these sections constituted separate cylinders.

I claim:

1. In a device of the class described, the combination with a cylinder, of an envelope surrounding the cylinder and provided with apertures, U-shaped tooth members, each having its arms extending through apertures in the envelope and the bridge connection between the arms confined between the envelope and the cylinder, and means to clamp the envelope to the cylinder.

2. In a device of the class described, the combination with a cylinder, of an envelope surrounding the cylinder and provided with apertures, U-shaped tooth members, each having its arms extending through apertures in the cylinder and the bridge connection between the arms confined between the envelope and the cylinder, means to clamp the envelope to the cylinder, a bench on which the cylinder is rotatably mounted, and a combined guard and bone support partially enclosing the cylinder and having a free edge on which the bone to be stripped may be supported.

3. In a device of the class described, the combination with a cylinder, of an envelope surrounding the cylinder and provided with apertures, U-shaped tooth members having their arms extending through the apertures and the bridge connection between the arms on the inside of the envelope, means to clamp the envelope to the cylinder, the teeth on said cylinder being divided into sections and the teeth of each section being shaped to give said section an individual exterior contour different from that of other sections.

4. In a device of the class described, the combination with a cylinder having a smooth exterior surface, of an apertured envelope surrounding said cylinder, U-shaped tooth members, each having its arms extending through apertures in the envelope and having its bridge connection confined between the envelope and the smooth surface of the cylinder, and means to clamp the envelope to the cylinder.

In testimony whereof, I have signed my name to this specification.

LEONARD S. PEARL.